United States Patent
Saleh et al.

(10) Patent No.: US 9,949,192 B1
(45) Date of Patent: Apr. 17, 2018

(54) SELECTION OF A HANDOVER TARGET BASED AT LEAST ON A DETERMINATION THAT THE SELECTED HANDOVER TARGET DOES NOT HAVE A WIRELESS RELAY BACKHAUL CONNECTION

(71) Applicant: Sprint Spectrum L.P., Overland Park, KS (US)

(72) Inventors: Ahmad N. Saleh, Overland Park, KS (US); Jasinder P. Singh, Olathe, KS (US); Deveshkumar N. Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/170,080

(22) Filed: Jun. 1, 2016

(51) Int. Cl.
*H04W 36/16* (2009.01)
*H04W 36/00* (2009.01)
*H04W 36/14* (2009.01)

(52) U.S. Cl.
CPC ..... *H04W 36/165* (2013.01); *H04W 36/0027* (2013.01); *H04W 36/0072* (2013.01); *H04W 36/0088* (2013.01); *H04W 36/14* (2013.01)

(58) Field of Classification Search
CPC .......................... H04W 84/047; H04W 36/08
See application file for complete search history.

(56) References Cited

U.S. PATENT DOCUMENTS

| | | | |
|---|---|---|---|
| 8,804,528 B2 * | 8/2014 | Shiotsuki | H04W 40/12 370/236 |
| 9,072,039 B2 * | 6/2015 | Hu | H04W 48/20 |
| 9,131,429 B1 * | 9/2015 | Bharadwaj | H04W 4/22 |
| 9,736,738 B2 * | 8/2017 | Zhang | H04W 36/0033 |
| 2009/0185492 A1 * | 7/2009 | Senarath | H04B 7/155 370/238 |
| 2010/0157845 A1 * | 6/2010 | Womack | H04B 7/2606 370/254 |
| 2012/0295626 A1 * | 11/2012 | Kitaji | H04B 7/155 455/438 |
| 2013/0052941 A1 * | 2/2013 | Kitaji | H04W 36/08 455/7 |
| 2013/0064105 A1 * | 3/2013 | Huang | H04L 43/0864 370/252 |
| 2013/0079018 A1 * | 3/2013 | Teyeb | H04W 36/32 455/441 |
| 2014/0349647 A1 * | 11/2014 | Chen | H04W 36/30 455/436 |

(Continued)

FOREIGN PATENT DOCUMENTS

WO 2011068237 A1 6/2011

*Primary Examiner* — Dung Hong

(57) ABSTRACT

Disclosed are methods and systems for selection of a handover target for a user equipment device (UE). In particular, a wireless communication system may serve the UE over an air interface connection between the UE and a source base station (BS). While the system serves the UE, the system may make a selection of a handover target for the UE. And in accordance with the disclosure, the selection may be based at least in part on the handover target not having a wireless relay backhaul connection. Once the system selects the handover target using the disclosed approach, the system may then trigger handover of the UE from being served by the source BS to being served by the selected handover target.

20 Claims, 5 Drawing Sheets

(56) References Cited

U.S. PATENT DOCUMENTS

| | | | |
|---|---|---|---|
| 2015/0296431 A1* | 10/2015 | Li | H04W 36/0066 |
| | | | 370/331 |
| 2016/0066223 A1* | 3/2016 | Sawhney | H04W 36/0083 |
| | | | 455/436 |
| 2016/0088527 A1* | 3/2016 | Wolff | H04W 36/0055 |
| | | | 455/436 |
| 2016/0345230 A1* | 11/2016 | Cuevas Ramirez | H04W 36/14 |
| 2017/0230844 A1* | 8/2017 | Li | H04M 7/006 |

* cited by examiner

SELECTION OF A HANDOVER TARGET BASED AT LEAST ON A DETERMINATION THAT THE SELECTED HANDOVER TARGET DOES NOT HAVE A WIRELESS RELAY BACKHAUL CONNECTION

BACKGROUND

A typical cellular wireless network includes a number of base stations (BSs) each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station (BS) may be coupled with network infrastructure that provides connectivity with one or more transport networks, such as the public switched telephone network (PSTN) and/or the Internet for instance. With this arrangement, a UE within coverage of the network may engage in air interface communication with a BS and may thereby communicate via the BS with various remote network entities or with other UEs served by the BS.

Further, a cellular wireless network may operate in accordance with a particular air interface protocol (radio access technology), with communications from the BSs to UEs defining a downlink or forward link and communications from the UEs to the BSs defining an uplink or reverse link. Examples of existing air interface protocols include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handover between coverage areas, and other functions related to air interface communication.

In accordance with the air interface protocol, each coverage area may define a number of channels or specific resources for carrying signals and information between the BS and UEs. For instance, certain resources on the downlink may be reserved to carry a reference signal that UEs may detect as an indication of coverage and may measure to evaluate coverage quality, other resources on the downlink may be reserved to carry other control signaling to UEs, and still other resources on the downlink may be reserved to carry bearer traffic and other such communications to UEs. Likewise, certain resources on the uplink may be reserved to carry various control signaling from UEs to the BS, and other resources on the uplink may be reserved to carry bearer traffic and other such communications from UEs.

As UEs enter into coverage of the BS, the BS may become configured with connections to serve those UEs. For instance, for each such UE entering coverage on a particular carrier, the BS may engage in signaling with the network infrastructure to establish a bearer connection for carrying data between a gateway system and the BS, and the BS may work with the UE to establish a radio-link-layer connection for carrying data over the air between the BS and the UE on the carrier. Once so configured, the BS may then serve the UEs.

In a further aspect, BSs in a cellular wireless network can be physically arranged in various ways. For instance, BSs may be co-located with each other by having their antenna structures at largely the same geographic location (within a defined tolerance, for instance). By way of example, a single cell site could be arranged to define two BSs with separate antenna structures on a common antenna tower or other base structure. And in another example, a single physical BS that provides service separately on first and second carriers could be considered to define the two separate BSs, one operating on the first carrier and the other operating on the second carrier. Alternatively, BSs in a cellular wireless network can be distributed at some distance from each other. In particular, the antenna structure of a given BS may be located at a geographic location that is at some non-zero distance from the antenna structure of another BS.

With these arrangements, the BSs of a wireless service provider's network would ideally provide seamless coverage throughout a market area, so that UEs being served by the system could move from coverage area to coverage area without losing connectivity. In practice, however, it may not be possible to operate a sufficient number of BSs or to position the BSs in locations necessary to provide seamless coverage. As a result, there may be holes in coverage.

One way to help to resolve this problem is to operate a relay node (RN) that effectively extends the range of a BS's coverage area so as to partially or completely fill a coverage hole. Such an RN may be configured with a wireless backhaul interface for communicating with and being served by the BS, referred to as a "donor BS," and may also be configured with a wireless access interface for communicating with and serving one or more end-user UEs, such as a cell phone, wirelessly equipped computer, tablet, and/or other device that is not set to provide wireless backhaul connectivity. For example, the RN could include a relay base station (relay-BS) that serves end-user UEs and could also include a relay-UE that is served by the donor BS and thus provides wireless backhaul connectivity for the relay-BS. In practice, the relay-BS and relay-UE could be integrated together as a single RN device or could be provided as separate devices communicatively linked together.

In this arrangement, the BS is considered to be a donor BS, in that the BS provides coverage to the relay-UE, and the relay-B S then provides coverage to one or more end-user UEs. Also, the wireless communication link between the donor BS and the relay-UE is considered to be a "relay backhaul link," and the wireless communication link between the relay-BS and UEs served by the relay-BS is considered to be a "relay access link." Further, to the extent the donor BS itself also serves end-user UEs, the wireless communication link between the donor BS and those UEs is considered to be a "donor access link."

Given these arrangements, a donor BS may receive from the network data packets destined to the relay-UE and perhaps ultimately destined to one or more of the end-user UEs being served by the relay-BS (referred to herein as RN-served UEs). In particular, when a data packet arrives over the transport network for transmission to the relay-UE or to an RN-served UE, the gateway system may transmit the data packet to the donor BS over the relay-UE's or the RN-served UE's bearer connection. Then, the donor BS may transmit the data packet over a wireless backhaul connection to the relay-UE. Moreover, the relay-BS may receive the data packet from the relay-UE and may then transmit the data packet to the RN-served UE if that data packet is destined to that RN-served UE.

Additionally, a donor BS may receive data packets from an RN-served UE via the RN arrangement. In particular, the relay-BS may receive a data packet from an RN-served UE. Subsequently, the relay-UE may receive the data packet from the relay-BS and may then transmit the data packet to the donor BS over the wireless relay backhaul connection. Once the donor BS receives the data packet, the donor BS may itself process the data packet or may further transmit the data packet to another network entity, so that the wireless communication system can ultimately transmit the data packet to another UE via the network for instance.

OVERVIEW

When a UE is served by a BS, the UE may regularly monitor the reference signal from that BS and reference signals from other BSs in the vicinity, to help ensure that the UE continues to operate in a most appropriate coverage area. If the UE finds that one or more other BSs provide sufficiently strong coverage, perhaps sufficiently stronger than the UE's currently serving BS, then the UE may initiate handover. For instance, the UE may transmit to its serving BS a measurement report that specifies the one or more detected coverage areas and, for each such coverage area, the detected signal strength. The serving BS (source BS) and/or associated network infrastructure may then decide based on the UE's measurement report to process a handover of the UE to a particular BS (target BS) from which the UE detected sufficiently strong signal strength.

In this way, when a UE is being served by a wireless communication system, the wireless communication system may hand over the UE between various BSs. In particular, the wireless communication system may hand over the UE to be served by a BS that does not have a wireless relay backhaul connection. Alternatively, the wireless communication system may hand over the UE to be served by a BS that does have a wireless relay backhaul connection, such as to be served by a relay-BS for instance. Unfortunately, however, a decision to hand over the UE to be served by a relay-BS may sometimes lead to problems.

For example, a UE may engage in a voice-over-LTE (VoLTE) call (or other high priority communication) and may experience interruptions to that VoLTE call after being handed over to be served by a relay-BS. In particular, after the UE is handed over and the relay-BS then serves the UE, data packets to and from the UE may flow through the wireless relay backhaul connection provided for the relay-BS by the relay-UE. Due to this wireless relay backhaul connection, the latency of data packets may increase. Consequently, the UE (and/or the other party to the VoLTE call) may experience a delay in receiving one or more such data packets, which could result in interruptions to the VoLTE call and/or a dropped call, among other outcomes.

In another example, a UE may hand out of being served by a small coverage relay-BS soon after being handed over to be served by that relay-BS. For instance, the wireless communication system may need to select a handover target for the UE and may end up selecting a relay-BS instead of selecting another BS, such as a BS that does not have a wireless relay backhaul connection for example. Due to use of RNs to help fill coverage holes, the relay-BS to which the UE is handed over may likely define a relatively small coverage area compared to the coverage area defined by the other BS. So given that the relay-BS may define a relatively small coverage area and that the UE may move towards the other BS soon after being handed over to the relay-BS, the system may subsequently hand over the UE to that other BS soon after the initial handover to the relay-BS. Thus, at least for the reason that the system could have initially selected the other BS, the initial handover to the relay-BS may be considered to be an excess handover that unnecessarily consumes network resources. Other examples are possible as well.

To help solve these problems, disclosed is an approach involving selection of a handover target based on the handover target not having a wireless relay backhaul connection. In practice, a wireless communication system and/or a UE may use this handover target selection approach in various situations. For instance, the system may use the disclosed approach in response to the system making a determination that a UE is engaged in a VoLTE call, in which case the approach can help to avoid handover of that UE to a relay-BS and thus to help avoid interruptions to the VoLTE call that may result from the wireless relay backhaul connection provided for the relay-BS. In another instance, the system may apply the disclosed approach when facing the above-described decision as whether to hand over the UE to be served by a relay-BS or whether to hand over the UE to be served by another BS. In this instance, if the system applies the disclosed approach, the system may end up handing over the UE to the other BS rather than handing over the UE to the relay-BS, which may help avoid excess handover of the UE. Other instances and advantages are possible as well.

Accordingly, in one respect, disclosed is method. In accordance with the method, a wireless communication system may serve a UE over an air interface connection between the UE and a source BS. While the system serves the UE, the system may make a selection of a handover target for the UE. In particular, as noted, the wireless communication system may make that selection based at least in part on the handover target not having a wireless relay backhaul connection. So once the system selects the handover target, the system may then trigger handover of the UE from being served by the source BS to being served by the selected handover target.

In another respect, disclosed is a wireless communication system. The wireless communication system may include a BS configured to provide an air interface through which the BS is operable to serve one or more UEs. Additionally, the wireless communication system may include a controller configured to make a selection of a handover target for a served UE. As noted, that selection may be based at least in part on the handover target not having a wireless relay backhaul connection. Furthermore, the controller may be configured to trigger handover of the served UE from being served by the BS to being served by the selected handover target.

In yet another respect, disclosed is another method. In accordance with the method, a UE may make a selection of a handover target for that UE. In particular, as noted, the UE may make that selection based at least in part on the handover target not having a wireless relay backhaul connection. So once the UE selects the handover target, the UE may then trigger handover of the UE from being served by the source BS to being served by the selected handover target.

Still further, in yet another respect, disclosed is a non-transitory computer-readable medium having stored thereon instructions executable by a processor to cause an entity (e.g., a wireless communication system and/or a UE) to carry out functions such as those noted above, to facilitate selection of a handover target for a UE.

These as well as other aspects, advantages, and alternatives will become apparent to those of ordinary skill in the art by reading the following detailed description, with reference where appropriate to the accompanying drawings.

Further, it should be understood that the description provided in this overview section and elsewhere in this document is provided by way of example only.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
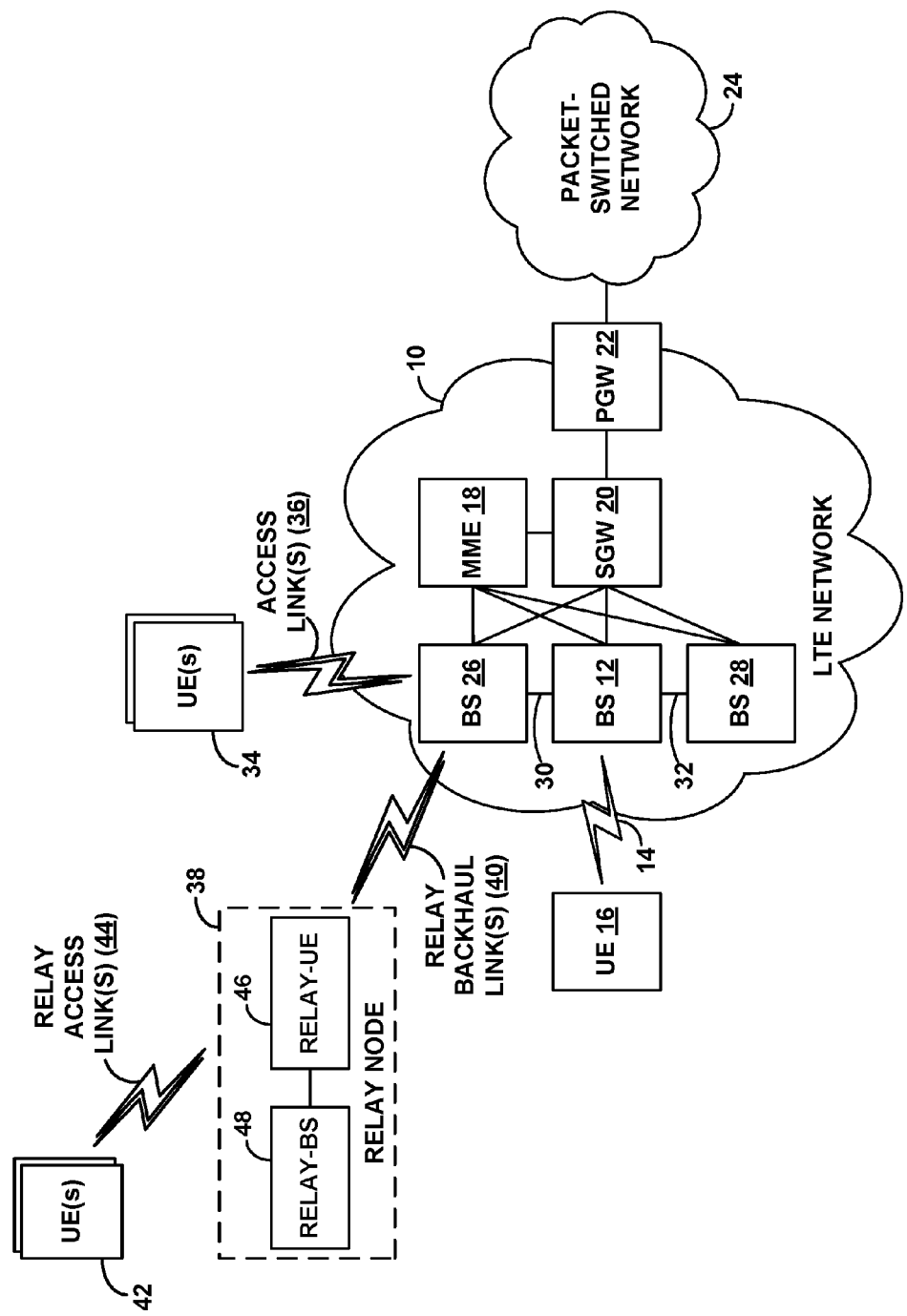
FIG. 1 is a simplified block diagram of a wireless communication system in which the present method can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but may also provide other functions. As shown, the LTE network includes a BS 12 (could also be referred to as an evolved Node B (eNodeB) 12), which has an antenna structure and associated equipment for providing an LTE coverage area 14 in which to serve UEs such as an example UE 16 as shown. The BS 12 then has a communication interface with a mobility management entity (MME) 18 that functions as a signaling controller for the LTE network. Further, the BS 12 has a communication interface with a serving gateway (SGW) 20, which in turn has a communication interface with a packet-data network gateway (PGW) 22 that provides connectivity with a packet-switched network 24 such as the Internet, and the MME 18 has a communication interface with the SGW 20.

Moreover, the illustrated communication system includes two other BSs 26 and 28 each interconnected with network infrastructure, such as with the MME 18 and the SGW 20, providing connectivity with one or more networks (e.g., the packet-switched network 24). Additionally, the various BSs 12, 26, and 28 may engage in signaling communication with each other. For example, BS 12 and BS 26 may communicate with each other over an X2 interface 30, which may physically pass through the core network(s) or over a more direct physical connection between the BS 12 and the BS 26. And BS 12 and BS 28 may communicate with each other over an X2 interface 32, which may physically pass through the core network(s) or over a more direct physical connection between the BS 12 and the BS 28.

Furthermore, FIG. 1 illustrates that the BS 26 may serve one or more end-user UEs 34 respectively over one or more access links 36 and may also serve an RN 38 over one or more relay backhaul links 40. Additionally, FIG. 1 illustrates that the RN 38 may then itself serve one or more end-user UEs 42 respectively over one or more relay access links 44. In practice, BS 26 may be configured to serve one or more RNs and could thus be referred to as a donor BS once the BS begins to serve one or more such RNs.

In the example arrangement of FIG. 1, the RN 38 is shown as including a relay-UE 46 and a relay-BS 48. In practice, the donor BS 26 may serve the relay-UE 46 and thus the relay-UE 46 may provide wireless backhaul connectivity for the relay-BS 48 via one or more relay backhaul links 40. Further, the relay-BS 48 could then serve one or more end-user UEs 42 via one or more relay access links 44. In this arrangement, the relay-UE 46 and relay-BS 48 could be integrated together as a single RN device or could be provided as separate devices communicatively linked together (e.g., via a local area network or other connection).

Through this communication system, each of the one or more UEs 34 may thus engage in communication on the network 24 via at least one of the access links 36, the BS 26, and the network infrastructure. Also, each of the one or more UEs 42 may engage in communication on the network 24 via at least one of the relay access links 44, the RN 38, at least one of the relay backhaul links 40, the BS 26, and the network infrastructure. Moreover, when relay-BS 48 engages in X2 communications with another BS (e.g., with the BS 12 over the X2 interface 30) and/or with other core network entities, those communications would pass via relay-UE 46, at least one of the relay backhaul links 40, the BS 26, and possibly other network infrastructure.

Given this arrangement, when a UE (e.g., the relay-UE 46 or one of the other described UEs) enters into coverage of a given one of the above-described BSs, the UE may detect that BS's coverage on a particular carrier, and the UE and the BS may then engage in an attach process or handover process to register the UE with the network on that carrier. For instance, the BS and the UE may engage in radio resource control (RRC) signaling to establish on the carrier an RRC connection defining a radio-link-layer connection between the UE and the BS. Further, the UE may transmit to the BS an attach request, which the BS may pass along to the network infrastructure (e.g., to the MME 18), triggering a process of authenticating the UE and establishing one or more bearer connections for the UE between the BS and the network infrastructure, among other operations. Moreover, through this process, the BS, the network infrastructure, and/or the UE may each store a context record indicating that the BS is serving the UE on that carrier and perhaps also indicating other information.

With the arrangement of FIG. 1, a UE may engage in communication with various remote communication-entities, such as servers or other end-user devices, on or via network 24. These entities may take various forms and may be configured to communicate different types of content. By way of example, one entity may be voice-call server such as an Internet Multimedia Subsystem (IMS) platform that provides voice-call services for UEs (e.g., one or more entities of the IMS platform may help facilitate a VoLTE call), and other entity may be a data server such as a web server, e-mail server, streaming video server, game server, or the like. Other examples are possible as well.

As noted, when a UE is being served by a wireless communication system, the system may hand over the UE between various BSs. For example, the LTE network 10 may facilitate handover of the UE 16 from being served by BS 12 to being served by a BS that does not have a wireless relay backhaul connection, such as to be served by BS 28 for instance. And in another example, the LTE network 10 may facilitate handover of the UE 16 from being served by BS 12 to being served by a BS that does have a wireless relay backhaul connection, such as to be served by the relay-BS 48 for instance. However, as noted, a decision to hand over a UE to be served by a relay-BS may sometimes lead to problems, such interruptions to a VoLTE call and/or to unnecessary consumption of network resources, among other examples.

As further noted above, the present disclosure provides methods and systems for selecting a handover target for a UE, so as to help solve the above-described problems. In accordance with the disclosure, a wireless communication system and/or the UE itself may select the handover target based on the handover target not having a wireless relay backhaul connection. And once the handover target is selected, the wireless communication system and/or the UE may then trigger handover of the UE to be served by that selected handover target.

Moreover, this process could be carried out by the UE being handed over, by the BS that serves the UE being handed over, and/or by one or more other network entities, such as with portions of the analysis carried out by an entity outside of serving BS and the serving BS then responsively working to direct handover of the UE. For simplicity, however, the process will generally be described here in a scenario where the serving BS carries out all aspects of the disclosed process.

More specifically, when a UE is being served by a BS on a particular carrier ("serving carrier"), the UE may monitor signal strength (e.g., signal-to-noise ratio) of reference signals received from the serving BS, and the UE may apply various thresholds to control carrier frequency scanning and possible resulting handover to another carrier frequency (e.g., provided by the same serving BS or by another BS). For example, an air interface protocol may define a start-scanning threshold for serving-carrier signal strength, such that when the UE detects that the signal strength on the serving carrier is lower than the start-scanning threshold, the UE starts to scan for coverage on one or more other carriers. Further, an air interface protocol may define a handover threshold for serving-carrier signal strength (e.g., equal to or lower than the start-scanning threshold), such that when the UE finds coverage on at least one target carrier of a BS and detects that the signal strength on the serving carrier is lower than the handover threshold, the UE begins engaging in signaling with its serving BS to possibly trigger handover of the UE to that target carrier.

In practice, the signaling that the UE engages in to possibly trigger handover may take one of various forms. In some cases, the UE may transmit to its serving BS a measurement report that specifies the coverage detected on one or more carriers and, for each such detected coverage, the detected signal strength, thereby indicating one or more candidate handover targets (e.g., one or more candidate BSs). The serving BS and/or associated network infrastructure may then decide based on the UE's measurement report to process a handover of the UE to a particular handover target from which the UE detected sufficiently strong signal strength. In doing so, the serving BS and/or associated network infrastructure may select the particular handover target from among the one or more candidate handover targets, such as based on detected signal strength and/or the disclosed approach, among other possibilities.

In other cases, the UE may engage in signaling with its serving BS to simply request handover to a detected handover target, which the UE may select based on detected signal strength and/or the disclosed approach, among other possibilities. And the BS may respond to the request by engaging in handover signaling with other network entities and/or with the UE so as to carry out the handover. Other thresholds and cases are possible as well.

Once one or more candidate handover targets have been determined, a serving BS may determine in various ways whether or not a candidate handover target has a wireless relay backhaul connection. For instance, a candidate BS may itself have stored thereon or may otherwise have access to information specifying whether or not that candidate BS has a wireless relay backhaul connection. In practice, that information could simply take the form of a binary value indicative of whether or not that candidate BS has a wireless relay backhaul connection, or could take on other forms as well. For example, a binary value of zero may indicate that a BS does not have a wireless relay backhaul connection and a binary value of one may indicate that a BS has a wireless relay backhaul connection. As such, a serving BS may engage in communication with the candidate BS and, in doing so, may receive from that candidate BS (e.g., upon request) the information specifying whether or not the candidate BS has a wireless relay backhaul connection. Then, based on the received information, the serving BS may determine whether or not the candidate BS has a wireless relay backhaul connection.

By way of example, assuming that the BS 12 seeks to hand over the UE 16 and that the candidate handover targets are the BS 28 and the relay-BS 48, the serving BS 12 may engage in communication with those BSs to help facilitate the disclosed process. In particular, the serving BS 12 may engage in communication (e.g., via the X2 interface 30) with the relay-BS 48 to receive from the relay-BS 48 information specifying whether or not the relay-BS 48 has a wireless relay backhaul connection. And based on the information received from the relay-BS 48, the serving BS 12 may then determine that the relay-BS 48 does have a wireless relay backhaul connection. Additionally, the serving BS 12 may engage in communication (e.g., via the X2 interface 32) with the BS 28 to receive from the BS 28 information specifying whether or not the BS 28 has a wireless relay backhaul connection. And based on the information received from the BS 28, the serving BS 12 may then determine that the BS 28 does not have a wireless relay backhaul connection. Other examples are also possible.

Once the serving BS makes a determination of whether or not a candidate handover target has a wireless relay backhaul connection and does so for at least one such candidate handover target, the serving BS may then carry out selection of a handover target for a UE in accordance with the disclosed process.

In one example implementation, the serving BS may evaluate one candidate BS at a time when selecting a handover target for a UE. In particular, the serving BS may determine whether or not a first candidate BS has a wireless relay backhaul connection. If the serving BS determines that the first candidate BS does not have a wireless relay backhaul connection, then the serving BS may responsively select that first candidate BS as the handover target for the UE. Whereas, if the serving BS determines that the first candidate BS does have a wireless relay backhaul connection, then the serving BS may responsively evaluate a second candidate BS in the same way, and so on. In this manner, the serving BS may evaluate one candidate BS at a time and may do so until the serving BS determines that a candidate BS does not have a wireless relay backhaul connection. And when the serving BS encounters such a candidate BS, the serving BS may select that candidate BS as the handover target for the UE.

In another example implementation, the serving BS may compare multiple candidate BSs when selecting a handover target for a UE. In particular, the serving BS may need to select a handover target between at least a first candidate BS and a second candidate BS. In this situation, the serving BS may determine whether or not the first candidate BS has a wireless relay backhaul connection and may also determine whether or not the second candidate BS has a wireless relay backhaul connection. And based on such determinations, the serving BS may compare the candidate BSs so as to select the handover target from among these BSs.

In one case, the serving BS may determine that the first candidate BS has a wireless relay backhaul connection and that the second candidate BS does not have a wireless relay backhaul connection. In this case, based on the serving BS's determination, the serving BS may select the second candidate BS as the handover target for the UE rather than selecting the first candidate BS as the handover target for the UE. In another case, the serving BS may determine that the first candidate BS does not have a wireless relay backhaul connection and that the second candidate BS does have a wireless relay backhaul connection. In this case, based on the serving BS's determination, the serving BS may select the first candidate BS as the handover target for the UE rather than selecting the second candidate BS as the handover target for the UE.

In yet another case, the serving BS may determine (i) that the first candidate BS does not have a wireless relay backhaul connection and that the second candidate BS also does not have a wireless relay backhaul connection or (ii) that the first candidate BS has a wireless relay backhaul connection and that the second candidate BS also has a wireless relay backhaul connection. In this case, based on the serving BS's determination, the serving BS may select between the first and second candidate BSs based on other factors, such as those currently known (e.g., based on detected signal strength considerations) and/or those developed in the future.

Once the serving BS selects a handover target for the UE in accordance with the disclosed process, the serving BS may then trigger handover of the UE to be served by that selected handover target. In practice, triggering handover of the UE may involve invoking a process to orchestrate the handover or to otherwise cause the handover to occur. By way of example, to hand over the UE 16 from the serving BS 12 to BS 28, the serving BS 12 may generate and transmit (e.g., over the X2 interface 32) to the BS 28 a handover request signal that requests the handover. With further signaling and reservation of resources, BS 28 may then send a handover response signal to BS 12. And BS 12 may then transmit to the UE 16 an RRC connection reconfiguration message directing the UE to transition from being served by BS 12 to instead being served by BS 28. Other examples are also possible.

In a further aspect, a serving BS may carry out the disclosed handover target selection process for a UE in response to one or more of various determinations. In one case, a serving BS may carry out the disclosed selection process in response to the serving BS making a determination that the UE for which a handover target is being selected is engaging in a VoLTE call or other such high priority (e.g., latency-sensitive) communication. In this way, the serving BS can ensure that the UE is not handed over to a BS that has a wireless relay backhaul connection while the UE is engaged in a high priority communication, thereby avoiding interruptions to the communication that may result from the wireless relay backhaul connection.

In particular, the serving BS may determine a type of communication in which the UE engages, and the serving BS may then refer to mapping data or the like to determine whether the determined type of communication is one for which the BS should trigger use of the disclosed selection process. And if the serving BS determines that the type of communication in which the UE is engaged is indeed one for which the BS should trigger use of the disclosed selection process, then the serving BS may responsively trigger use of the disclosed selection process.

In practice, the serving BS (and/or other entity) could determine in various ways the type of communication in which a UE engages. For example, the BS could consider the type of bearers, flows, or the like over which the UE engages in certain communication and determine the communication type on that basis. As another example, the BS could engage in deep packet inspection or the like, to read data such as communication setup messaging or communication content itself flowing to or from the UE, as a basis to determine the type of communication. Other examples are also possible.

In another case, a serving BS may carry out the disclosed selection process in response to making a determination that the UE is engaged in a communication with another party and that the other party is served by a BS that has a wireless relay backhaul connection. In particular, if the serving BS were to hand over the UE to a selected BS that does have a wireless relay backhaul connection, data packets of the communication would then flow both (i) over the selected BS's wireless relay backhaul connection and (ii) over the wireless relay backhaul connection of the BS serving the other party. Thus, by selecting a handover target that does not have a wireless relay backhaul connection, the serving BS can help ensure that latency of the communication does not increase due to packet flow over multiple wireless relay backhaul connections, which may ultimately help avoid or at least reduce interruptions to the communication. In practice, the serving BS can query one or more other network entities so as to make the determination in this case.

By way of example, the serving BS may query an entity on the IMS platform to identify the other party. In particular, an entity on the IMS platform may be configured to map a VoLTE call with respective identifiers (e.g., international mobile subscriber identity (IMSI)) of UEs engaged in that VoLTE call. Thus, once the serving BS determines that the UE is engaging in a VoLTE call, the serving BS may responsively query that entity on the IMS platform so as to determine the respective identifier of the other party to the VoLTE call and thus to identify the other party.

In another example, the serving BS may query an MME to determine whether or not the other party is being served by a BS that has a wireless relay backhaul connection. In particular, as noted, an MME may have stored a context record indicating a particular BS that is serving a given UE. Additionally, an MME may also have stored thereon or may otherwise have access to information specifying whether a particular BS has a wireless relay backhaul connection. With this arrangement, the serving BS may thus query an MME so as to determine whether or not the other party is being served by a BS that has a wireless relay backhaul connection.

More specifically, if the same MME serves both the UE for which a handover target is being selected as well as the other party, then the serving BS may query that MME so as to obtain the information. In particular, the MME may have stored a context record indicating the BS that is serving the UE as well as a context record indicating the BS that is serving the other party, and may also have stored thereon or otherwise have access to information specifying whether or not the BS serving the other party has a wireless relay backhaul connection. Thus, as noted, the serving BS may simply query that MME so as to obtain the information.

In other situations, however, an MME other than the one serving the UE may have the information specifying whether or not the other party to the communication is being served by a BS that has a wireless relay backhaul connection. In particular, a first MME may serve the UE and second MME (e.g., different from the first MME) may serve the other party, which means that the second MME likely has the information. For this reason, the serving BS may query the first MME so as to obtain the information, and the serving BS may then obtain that information from the second MME via the first MME. In practice, various entities may communicate with one another to help the serving BS obtain the information.

In particular, the first MME may initially determine which MME serves the other party and may do so in various ways. For instance, the first MME may communicate with a Home Subscriber Server (HSS), which may store account and service profiles for various UEs. In doing so, the first MME query the HSS (known as performing an "HSS dip") by providing to the HSS an identifier of the other party and by requesting an identity of the MME that serves the other party. Once the first MME receives the requested information from the HSS, the first MME may use that information to identify the second MME serving the other party. Then, the first MME may engage in communication with identified second MME (e.g., over an interface known as an S10 interface) so as to obtain from the second MME the information specifying whether or not the other party is being served by a BS that has a wireless relay backhaul connection. And the first MME may then transmit that information to the BS serving the UE. Other cases and examples are also possible.

In yet a further aspect, as noted, the UE being handed over may itself carry out the disclosed handover target selection process. In particular, the UE may determine that the UE should handover to be served by another BS and may determine one or more candidate BSs, such as based on signal strength considerations as discussed above for example. Then, the UE may select a handover target based on the handover target not having a wireless relay backhaul connection. In doing so, the UE may engage in communication with its serving BS so as to obtain from the BS information that may help the UE facilitate the selection.

For example, the UE may query its serving BS to obtain information specifying whether or not a given candidate BS has a wireless relay backhaul connection, and thus may make the selection of a handover target based at least on that obtained information. As noted, the serving BS may communicate with a candidate BS so as to receive from that information from the candidate BS. Further, in other examples, the UE could query its serving BS to obtain other types of information that the UE could use to facilitate the disclosed process, such as information specifying whether or not another party to a communication is being served by a BS that has a wireless relay backhaul connection, among other types of information discussed herein.

Once the UE selects a handover target in accordance with the disclosed process, the UE may then trigger handover to the selected handover target. For example, the UE may do so by simply transmitting to the serving BS a request requesting handover to that selected handover target. In another example, the UE may do so by transmitting to the serving BS a measurement report that specifies just the coverage detected on the selected handover target, so that the serving BS and/or associated network infrastructure may then decide based on the measurement report to process a handover of the UE to the selected handover target. Other examples are also possible.

Figure 2:
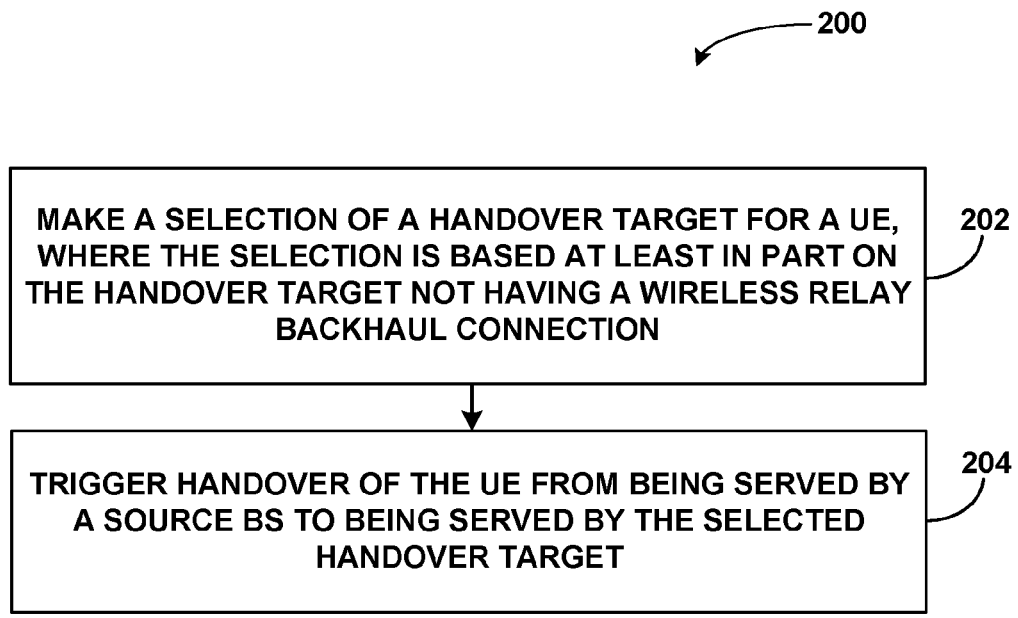
FIG. 2 is a flow chart depicting example operations in accordance with the present disclosure.

FIG. 2 is next a flow chart illustrating a method 200 according to an example embodiment. Illustrative methods, such as method 200, may be carried out in whole or in part by component(s) and/or arrangement(s), such as by the one or more of the components of the representative network shown in FIG. 1, with one or more of the components of the BS shown in FIG. 3 and further discussed below, and/or with one or more of the components of the UE shown in FIG. 5 and further discussed below. However, it should be understood that example methods, such as method 200, may be carried out by other entities or combinations of entities as well as in other arrangements, without departing from the scope of the disclosure.

As shown by block 202 in FIG. 2, method 200 involves making a selection of a handover target for a UE. As noted, that selection may be based at least in part on the handover target not having a wireless relay backhaul connection. Additionally, at block 204, method 200 then involves triggering handover of the UE from being served by a source BS to being served by the selected handover target.

Figure 3:
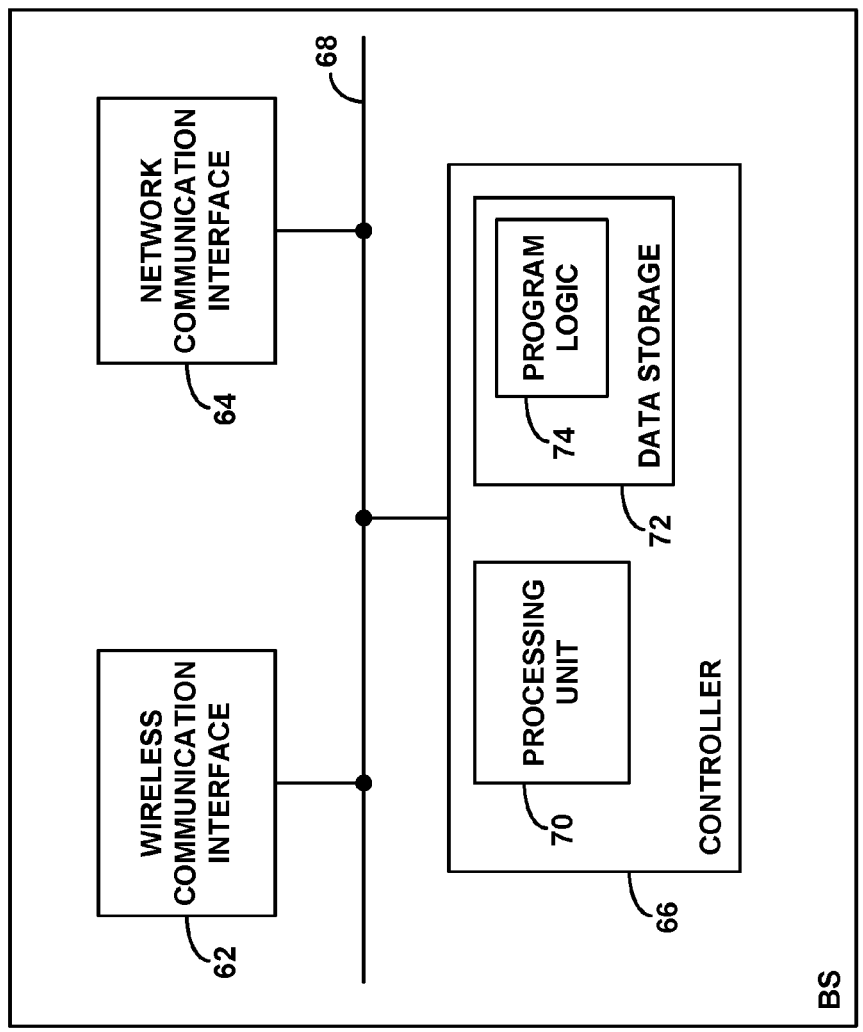
FIG. 3 is a simplified block diagram of an example base station operable in accordance with the present disclosure.

FIG. 3 is next a simplified block diagram of a representative BS, such as a BS taking the form of a base transceiver station, of an access node, of an access point, of a Node-B, or of an eNodeB, for instance (whether macro, femto or the like), illustrating some of the components that can be included in such an entity configured to operate in accordance with the present disclosure. As shown in FIG. 3, the representative BS includes at least one wireless communication interface 62, at least one network interface 64, and at least one controller 66, all of which may be integrated together in various ways and/or coupled together by a system bus, network, or other connection mechanism 68.

Each wireless communication interface 62 may function to wirelessly serve various entities, such as UEs and an RN as discussed above, communicating over an access link with one or more UEs and over a relay backhaul link with an RN. As such, each wireless communication interface 62 may comprise at least one antenna arrangement (not shown) for the representative BS, which may be tower mounted, and associated components such as at least one power amplifier and at least one cell site modem (not shown), so as to transmit and receive bearer and control data. Each network interface 64 may comprise a wired or wireless interface for communicating with various network infrastructure.

Controller 66 may then function to cause the BS to carry out various functions, such as those discuss herein. As such, controller 66 could take various forms. For instance, as shown, the controller 66 may include a processing unit 70 (e.g., one or more general purpose or special purpose processors) and data storage 72 (e.g., volatile and/or non-volatile storage such as magnetic, optical, flash or other storage) holding program logic 74 (e.g., machine language instructions) executable by the processing unit to carry out the various BS functions.

Figure 4:
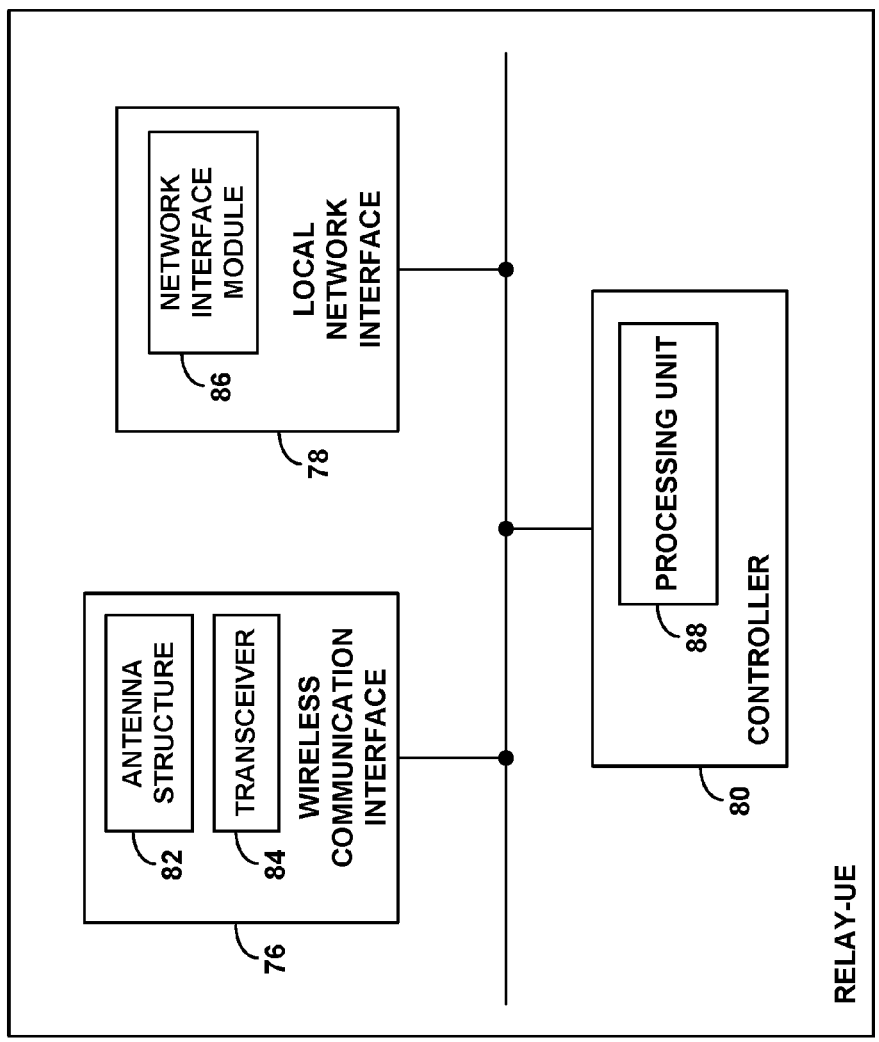
FIG. 4 is a simplified block diagram of an example relay-UE operable in accordance with the present disclosure.

Furthermore, FIG. 4 is a simplified block diagram of a relay-UE, showing some of the components that such an entity could include. As shown, the relay-UE includes a wireless communication interface 76, a local network interface 78, and a controller 80, any or all of which could be integrated together in various ways. In particular, the wireless communication interface 76 could include an antenna structure 82 and transceiver 84, for communicating over the air interface with a donor base station. The local network interface 78 could include a network interface module (e.g., Ethernet module) 86 for communicating with a relay-BS. And the controller 80 could include a processing unit 88 (e.g., one or more microprocessors or the like) programmed with instructions to carry out various relay-UE operations.

Figure 5:
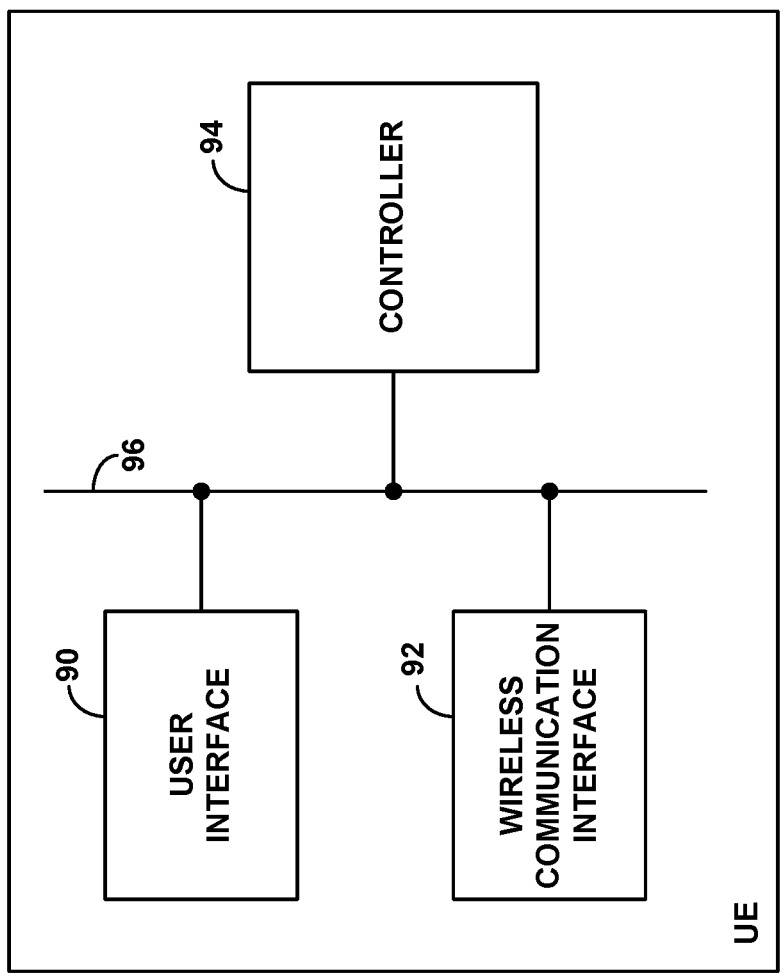
FIG. 5 is a simplified block diagram of an example UE operable in accordance with the present disclosure.

Finally, FIG. 5 is a simplified block diagram of an example UE, showing some of the components that can be included in such a UE. As shown in FIG. 5, the example UE includes a user interface 90, a wireless communication interface 92, and a controller 94, all of which may reside within or on a housing and be integrated or communicatively linked together by a system bus, network, or other connection mechanism 96.

User interface 90 is configured to allow the UE to receive user input and provide user output. Thus, the user interface may include one or more input components such as a microphone, a camera, a keypad, and a touch-sensitive display. And the user interface may include one or more output components such as a sound speaker and a display screen. Further, the user interface may include analog-digital conversion circuitry, such for converting voice input to a digital representation of the voice and for converting a digital representation of voice into speech output.

Wireless communication interface 92 is configured to allow the UE to engage in wireless communication over the air interface with a BS. In particular, the wireless communication interface 92 may include or be interconnected with one or more antenna structures each arranged to facilitate air interface communications. Also, the interface 92 may include a processing unit programmed with program instructions to facilitate communication in accordance with one or more communication protocols for instance.

Controller 94, which may effectively be part of the wireless communication interface or may be provided separately, may then or therefore be configured to cause the UE to carry out various UE operations, such as selection of a handover target. As such, the controller 94 may take various forms. For instance, the controller 94 may be hard coded or provided as hardware such as an application specific integrated circuit or other structure. Alternatively or additionally, the controller 94 could be provided as one or more processors (e.g. one or more microprocessors), non-transitory data storage, and program instructions stored in the data storage and executable by the processor(s) to carry out the various operations.

Exemplary embodiments have been described above. It should be understood, however, that variations from these embodiments are possible, while remaining within the true spirit and scope of the invention.

We claim:

1. A method comprising:
   serving, by a wireless communication system, a first user equipment device (UE) over an air interface connection between the first UE and a source base station (BS);
   while serving the first UE, making a selection, by the wireless communication system, of a handover target for the first UE, wherein the selection is based at least in part on the handover target not having a wireless relay backhaul connection; and
   triggering, by the wireless communication system, handover of the first UE from being served by the source BS to being served by the selected handover target,
   wherein the method further comprises making a determination that the first UE is engaged in a communication with a second UE and that the second UE with which the first UE is engaged in the communication is served by a BS that has a wireless relay backhaul connection, and wherein the selection being based at least in part on the handover target not having a wireless relay backhaul connection is responsive at least to making the determination that the second UE is served by a BS that has a wireless relay backhaul connection.

2. The method of claim 1, wherein the selection is between at least (i) a first candidate BS as the handover target and (ii) a second candidate BS as the handover target, and wherein making the selection of the handover target for the first UE based at least in part on the handover target not having a wireless relay backhaul connection comprises:
   making a determination that the first candidate BS has a wireless relay backhaul connection and that the second candidate BS does not have a wireless relay backhaul connection; and
   based on the determination that the first candidate BS has a wireless relay backhaul connection and that the second candidate BS does not have a wireless relay backhaul connection, selecting the second candidate BS as the handover target rather than selecting the first candidate BS as the handover target.

3. The method of claim 1, further comprising:
   while serving the first UE, making a determination, by the wireless communication system, that the first UE is engaging in a high priority communication,
   wherein the selection being based at least in part on the handover target not having a wireless relay backhaul connection is further responsive at least to making the determination that the first UE is engaging in the high priority communication.

4. The method of claim 3, wherein the high priority communication is a voice-over-LTE (VoLTE) call, and wherein the selection being based at least in part on the handover target not having a wireless relay backhaul connection is further responsive at least to making the determination that the first UE is engaging in the VoLTE call.

5. The method of claim 1, further comprising:
   querying, by the wireless communication system, a network entity to find out whether or not the second UE is served by a BS that has a wireless relay backhaul connection and receiving from the network entity a response indicative of whether or not the second UE is served by a BS that has a wireless relay backhaul connection,
   wherein making the determination that the second UE with which the first UE is engaged in the communication is served by a BS that has a wireless relay backhaul connection is based on the received response.

6. The method of claim 5, wherein the network entity is a mobility management entity (MME) that is configured to obtain information indicative of whether or not the second UE is served by a BS that has a wireless relay backhaul connection.

7. A wireless communication system comprising:
   a base station (BS) configured to provide an air interface through which the BS is operable to serve one or more user equipment devices (UEs); and a controller configured to:
  make a selection of a handover target for a first UE, wherein the selection is based at least in part on the handover target not having a wireless relay backhaul connection; and
  trigger handover of the first UE from being served by the BS to being served by the selected handover target,
  wherein the controller is further configured to make a determination that a first UE is engaged in a communication with a second UE and that the second UE with which the first UE is engaged in the communication is served by a BS that has a wireless relay backhaul connection, and wherein the selection being based at least in part on the handover target not having a wireless relay backhaul connection is responsive at least to making the determination that the second UE is served by a BS that has a wireless relay backhaul connection.

8. The wireless communication system of claim 7, wherein the selection is between at least (i) a first candidate BS as the handover target and (ii) a second candidate BS as the handover target, and wherein the controller being configured to make the selection of the handover target for the first UE based at least in part on the handover target not having a wireless relay backhaul connection comprises the controller being configured to:
  make a determination that the first candidate BS has a wireless relay backhaul connection and that the second candidate BS does not have a wireless relay backhaul connection; and
  based on the determination, select the second candidate BS as the handover target rather than selecting the first candidate BS as the handover target.

9. The wireless communication system of claim 8, wherein the BS is configured to receive, from the first candidate BS, first information specifying whether or not the first candidate BS has a wireless relay backhaul connection, wherein the BS is configured to receive, from the second candidate BS, second information specifying whether or not the second candidate BS has a wireless relay backhaul connection, and wherein the controller being configured to make the determination comprises the controller being configured to:
  based on the received first information, determine that the first candidate BS has a wireless relay backhaul connection; and
  based on the received second information, determine that the second candidate BS does not have a wireless relay backhaul connection.

10. The wireless communication system of claim 9, wherein the BS being configured to receive the first information from the first candidate BS comprises the BS being configured to receive the first information over a first X2 interface between the BS and the first candidate BS, and
  wherein the BS being configured to receive the second information from the second candidate BS comprises the BS being configured to receive the second information over a second X2 interface between the BS and the second candidate BS.

11. The wireless communication system of claim 7, wherein the controller is further configured to:
  determine that the first UE is engaging in a high priority communication, and
    wherein the selection being based at least in part on the handover target not having a wireless relay backhaul connection is further responsive at least to determining that the first UE is engaging in a high priority communication.

12. The wireless communication system of claim 11, wherein the controller being configured to determine that the first UE is engaging in a high priority communication comprises the controller being configured to determine that the first UE is engaging in a voice-over-LTE (VoLTE) call, and
  wherein the selection being based at least in part on the handover target not having a wireless relay backhaul connection is further responsive at least to determining that the first UE is engaging in the VoLTE call.

13. The wireless communication system of claim 7, wherein the controller is further configured to:
  query a network entity to find out whether or not the second UE is served by a BS that has a wireless relay backhaul connection and receive from the network entity a response indicative of whether or not the second UE is served by a BS that has a wireless relay backhaul connection,
  wherein making the determination that the second UE with which the first UE is engaged in the communication is served by a BS that has a wireless relay backhaul connection is based on the received response.

14. The wireless communication system of claim 13, further comprising a mobility management entity (MME) that is configured to obtain information indicative of whether or not the second UE is served by a BS that has a wireless relay backhaul connection, wherein the network entity is the MME.

15. The wireless communication system of claim 7, wherein the controller being configured to make the determination that the first UE is engaged in a communication with a second UE comprises the controller being configured to:
  determine that the first UE is engaging in a voice-over-LTE (VoLTE) call;
  in response to determining that the first UE is engaging in the VoLTE call, query another network entity of the wireless communication system to determine an identifier of another UE that also engages in the VoLTE call; and
  based on the identifier, determine that the first UE is engaging in the VoLTE call with the second UE.

16. The wireless communication system of claim 15, wherein the other entity is part of an Internet Multimedia Subsystem (IMS) platform that facilitates the VoLTE call.

17. A method comprising:
  making a selection, by a first user equipment device (UE) being served over an air interface connection between the first UE and a source base station (BS), of a handover target for the first UE, wherein the selection is based at least in part on the handover target not having a wireless relay backhaul connection; and
  triggering, by the first UE, handover of the first UE from being served by the source BS to being served by the selected handover target,
  wherein the method further comprises making a determination that the first UE is engaged in a communication with a second UE and that the second UE with which the first UE is engaged in the communication is served by a BS that has a wireless relay backhaul connection, and wherein the selection being based at least in part on the handover target not having a wireless relay backhaul connection is responsive at least to making the determination that the second UE is served by a BS that has a wireless relay backhaul connection.

18. The method of claim 17, wherein the selection is between at least (i) a first candidate BS as the handover target and (ii) a second candidate BS as the handover target, and wherein making the selection of the handover target for the first UE based at least in part on the handover target not having a wireless relay backhaul connection comprises:
   making a further determination that the first candidate BS has a wireless relay backhaul connection and that the second candidate BS does not have a wireless relay backhaul connection; and
   based on the further determination, selecting the second candidate BS as the handover target rather than selecting the first candidate BS as the handover target.

19. The method of claim 18, wherein the source BS is configured to receive, from the first candidate BS, first information specifying whether or not the first candidate BS has a wireless relay backhaul connection, wherein the source BS is configured to receive, from the second candidate BS, second information specifying whether or not the second candidate BS has a wireless relay backhaul connection, and wherein making the further determination comprises:
   querying the source BS, by the first UE, to obtain the first and second information;
   based on the obtained first information, determining that the first candidate BS has a wireless relay backhaul connection; and
   based on the obtained second information, determining that the second candidate BS does not have a wireless relay backhaul connection.

20. The method of claim 17, wherein triggering handover of the first UE comprises transmitting, by the first UE to the source BS, an indication of the selected handover target.

* * * * *